May 12, 1925.  
F. A. BOWER ET AL  
1,537,579  
VEHICLE  
Filed March 15, 1923

Inventors:  
FERDINAND A. BOWER AND  
ENOS A. DE WATERS  
By his Attorneys  
Blackmore, Spencer & Flint.

Patented May 12, 1925.

1,537,579

UNITED STATES PATENT OFFICE.

FERDINAND A. BOWER AND ENOS A. DE WATERS, OF FLINT, MICHIGAN, ASSIGNORS TO GENERAL MOTORS CORPORATION, OF DETROIT, MICHIGAN, A CORPORATION OF DELAWARE.

VEHICLE.

Application filed March 15, 1923. Serial No. 625,394

*To all whom it may concern:*

Be it known that we, FERDINAND A. BOWER and ENOS A. DE WATERS, citizens of the United States, and residents of Flint, county of Genesee, and State of Michigan, have invented certain new and useful Improvements in Vehicles, of which the following is a full, clear, concise, and exact description, such as will enable others skilled in the art to which the invention relates to make and use the same, reference being made therein to the accompanying drawings, which form a part of this specification.

This invention relates to self-propelled vehicles, and particularly to novel brackets for the brake-operating shafts of such vehicles, and is illustrated as embodied in an automobile.

An object of the invention is to support the brake-operating shaft in such a manner as to minimize action on the brakes due to relative movement of the sprung and unsprung parts of the vehicle. A further object is to provide strong and inexpensive means for so supporting the shaft. These objects are attained by providing a bracket arranged to support the shaft, as by forming a bearing therefor in each of two oppositely-extending arms, immediately adjacent the front universal joint of the propeller shaft. The bracket may be arranged to embrace the propeller-shaft housing, or to be secured to the universal joint housing; in the preferred form it has a sleeve which so embraces the propeller-shaft housing and a flange to be secured to a flange on the universal joint housing, and thus has the additional function of a connection between the two housings. In one embodiment of the invention separate emergency-brake and service-brake shafts are both mounted in the bracket.

The above and other features and objects of the invention, including various novel combinations and desirable particular constructions of parts, will be apparent from the following description of the illustrative embodiment of the invention shown in the accompanying drawings, in which.

Figure 3:
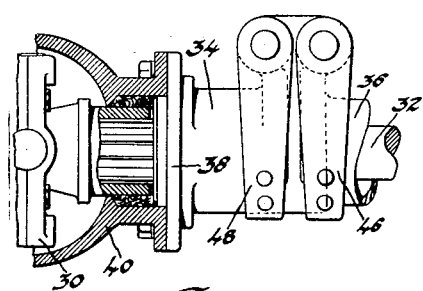
Figure 3 is a side elevation of the front end of the propeller-shaft housing of Figure 1, with the bracket associated therewith.
Figure 1:
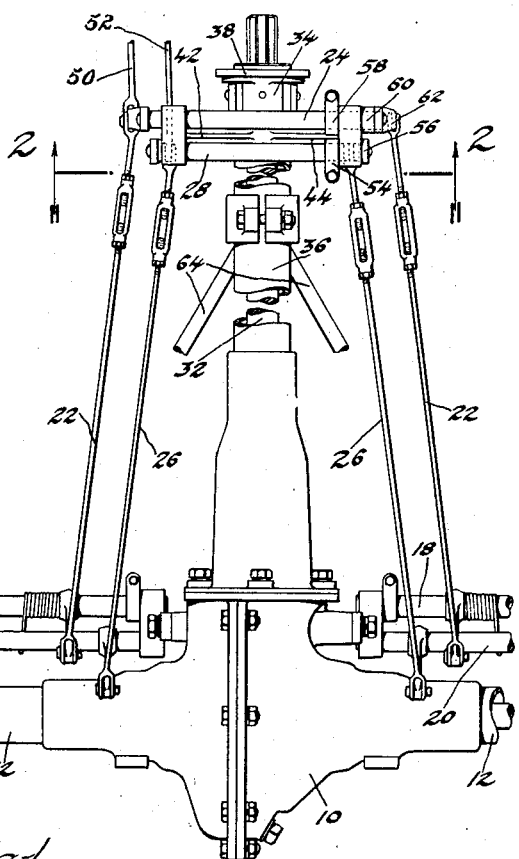
Figure 1 is a top plan view of part of the running gear of an automobile.
Figure 1:
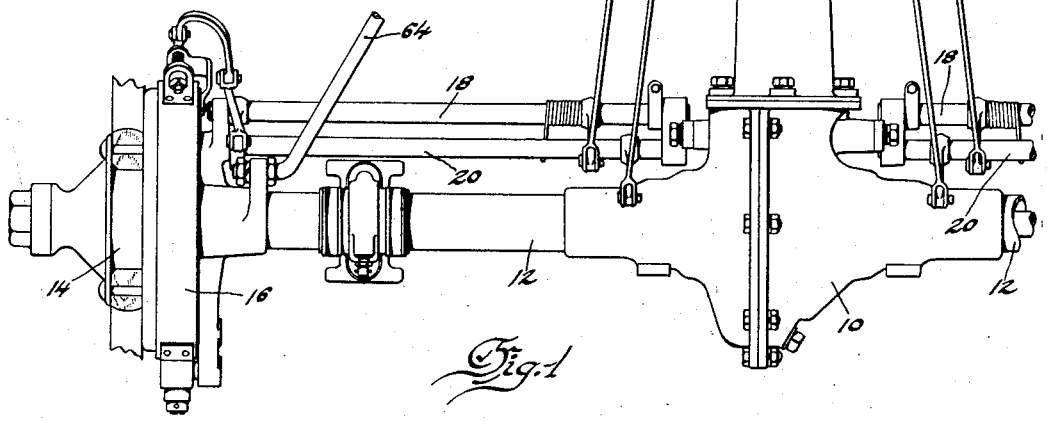
Figure 2:
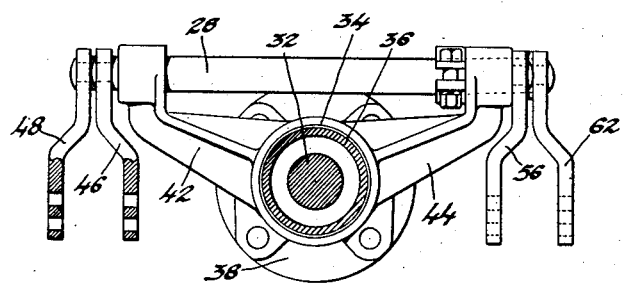
Figure 2 is a section on the line 2—2 of Figure 1, showing the novel bracket in rear elevation.

The running gear shown in Figure 1 comprises a rear axle having a differential housing 10 and axle housing 12, the axle being arranged to drive and to be supported by wheels 14, and the axle and wheels supporting cooperating parts of brakes 16, shown as comprising an internal and an external brake on each wheel. The external brakes are operated by rock-shafts 18, and the internal brakes by rock-shafts 20, the one set being used as service brakes and the other set as emergency brakes. Rock-shafts 18 are connected by links 22 with a brake-operating shaft 24, and rock-shafts 20 are similarly connected by links 26 with a brake-operating shaft 28.

In order to minimize and practically eliminate, the effect on the brakes of relative movement of the sprung and unsprung parts of the vehicle, it is important that shafts 24 and 28 be supported immediately adjacent the front universal joint 30 of propeller shaft 32, so that links 22 and 26 will swing with the propeller shaft about substantially the same axis. Hitherto one customary manner of doing this has been to support the brake-operating shafts on the chassis frame immediately above the universal joint, but this involves a vertical separation of the shafts and said joint such as to permit substantial relative movement therebetween under certain circumstances, in such a manner as undesirably to affect the brake pedal and the brakes, links 22 and 26 being operated by such relative movement on account of the vertical separation of the axes about which they swing from the axis in universal joint 30 about which propeller shaft 32 swings.

Having these considerations in view, my invention contemplates fixing the position of shafts 24 and 28 relatively to, and immediately adjacent, this axis, so that brake-operating relative movement is entirely eliminated. In the illustrated form this is accomplished by the use of a novel bracket having a sleeve 34 embracing the propeller-shaft housing or torque tube 36, and a flange 38 to be bolted or otherwise secured to a corresponding flange on a universal joint housing 40.

This bracket is formed with two pairs of oppositely extending arms, the arms on each side being preferably connected throughout their lengths so that from one point of view they may be regarded as a single arm. The arms extending to the left are indicated at 42 and those extending to the right at 44. Each arms is formed with a bearing to support one end of one of the shafts 24 and 28. These shafts have downwardly-extending arms 46 and 48, connected to links 50 and 52, operated by the brake pedal and the emergency brake lever. Radius rods 64 may be provided if desired. Shaft 28 is held against longitudinal movement by a clamp 54 and the arm 56 which is connected to link 26, and shaft 24 is held against such movement by a similar clamp 58 and a sleeve 60 seated against the arm 62 which operates link 22. To avoid interference, it will be noted that shaft 24, on the side next flange 38, is longer than shaft 28.

While one embodiment of our invention has been illustrated and described, it is not our intention to limit its scope thereby or otherwise than by the terms of the appended claims.

We claim:

1. A bracket having a flange to be secured to the flange of a universal housing, a sleeve to embrace a propeller shaft housing, and oppositely-extending arms formed with bearings for a transverse brake-operating shaft.

2. A bracket having a flange to be secured to the flange of a universal housing, a sleeve to embrace a propeller shaft housing, and two pairs of oppositely-extending arms each pair formed with bearings for a transverse brake-operating shaft.

3. A bracket having a flange to be secured to the flange of a universal housing, a sleeve to embrace a propeller shaft housing, and two pairs of oppositely extending arms, each pair formed with bearings for a transverse brake-operating shaft, in combination with two shafts, the shaft on the side next the flange being longer than the second shaft.

4. A bracket having a sleeve to embrace a propeller shaft housing, and oppositely-extending arms formed with bearings for a transverse brake-operating shaft.

5. A bracket having a sleeve to embrace a propeller shaft housing, and two pairs of oppositely-extending arms each formed with bearings for a transverse brake-operating shaft, in combination with two shafts, the one shaft being longer than the other.

6. A bracket having a flange to be secured to the flange of a universal housing and a pair of oppositely-extending arms formed with bearings for a transverse brake-operating shaft.

7. A bracket having a flange to be secured to the flange of a universal housing and two pairs of oppositely-extending arms each formed with bearings for a transverse brake operating shaft, in combination with two shafts, the shaft next the flange being longer than the other shaft.

8. A self-propelled vehicle having brakes, a propeller-shaft housing, brake-operating shafts, and a bracket mounted on the housing and supporting the shafts.

9. A self-propelled vehicle having brakes, a propeller-shaft housing, a universal joint housing, a brake-operating shaft, and a bracket embracing the propeller-shaft housing and secured to the universal joint housing and supporting the brake-operating shaft.

10. A propeller-shaft housing or torque tube formed and arranged to support a brake-operating shaft at its forward end, in combination with a transversely-extending brake-operating shaft supported thereby.

In testimony whereof we affix our signatures.

FERDINAND A. BOWER.
ENOS A. DE WATERS.